United States Patent
Hawes et al.

(10) Patent No.: US 7,331,415 B2
(45) Date of Patent: Feb. 19, 2008

(54) PEDESTRIAN IMPACT SENSING APPARATUS FOR A VEHICLE BUMPER

(75) Inventors: Kevin J. Hawes, Greentown, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 231 days.

(21) Appl. No.: 11/237,423

(22) Filed: Sep. 28, 2005

(65) Prior Publication Data

US 2007/0090931 A1    Apr. 26, 2007

(51) Int. Cl.
*B60K 28/10* (2006.01)
(52) U.S. Cl. ............. 180/274; 340/436
(58) Field of Classification Search ........ 180/271, 180/274; 280/735; 340/436
See application file for complete search history.

(56) References Cited

U.S. PATENT DOCUMENTS

| | | | | |
|---|---|---|---|---|
| 3,042,344 | A * | 7/1962 | Etheridge | ............ 244/76 R |
| 5,917,180 | A | 6/1999 | Reimer et al. | |
| 6,116,095 | A * | 9/2000 | Radle | ............ 73/861.01 |
| 6,607,212 | B1 | 8/2003 | Reimer et al. | |
| 6,784,792 | B2 | 8/2004 | Mattes et al. | |
| 7,025,163 | B2 * | 4/2006 | Fuertsch et al. | ............ 180/274 |
| 2003/0212510 | A1 * | 11/2003 | Gee | ............ 702/50 |
| 2007/0000710 | A1 * | 1/2007 | Hawes et al. | ............ 180/274 |
| 2007/0103283 | A1 * | 5/2007 | Nonaka et al. | ............ 340/436 |

FOREIGN PATENT DOCUMENTS

| | | |
|---|---|---|
| DE | 101 14 465 | 9/2002 |
| DE | 101 42 173 | 3/2003 |
| DE | 102 44 732 | 4/2004 |
| EP | 1 281 582 | 2/2003 |
| EP | 1350683 A2 * | 10/2003 |
| GB | 2 396 942 | 7/2004 |
| WO | 02/20313 | 3/2002 |
| WO | 02/083462 | 10/2002 |

\* cited by examiner

*Primary Examiner*—Paul N. Dickson
*Assistant Examiner*—Joseph Rocca
(74) *Attorney, Agent, or Firm*—Doug D. Fekete

(57) ABSTRACT

An impact sensing apparatus includes a laterally extending air channel within a block of foam or other crushable medium disposed between a bumper fascia and a rigid bumper frame element, and one or more airflow sensors for detecting airflow within the air channel. The air channel may be defined by a flexible hollow tube embedded within the crushable medium or by a molded-in air cavity in cases where the crushable medium is formed by molding. The measured airflow provides a measure of crush rate, and two or more airflow sensors may be distributed within the air channel to optimize impact detection response time and to identify the impact location.

11 Claims, 3 Drawing Sheets

PEDESTRIAN IMPACT SENSING APPARATUS FOR A VEHICLE BUMPER

TECHNICAL FIELD

The present invention relates to pedestrian impact detection for a vehicle, and more particularly to an airflow sensing apparatus incorporated into a vehicle bumper.

BACKGROUND OF THE INVENTION

A vehicle can be equipped with deployable safety devices designed to reduce injury to a pedestrian struck by the vehicle. For example, the vehicle may be equipped with one or more pedestrian air bags and/or a device for changing the inclination angle of the hood. Since the initial point of impact is nearly always the bumper, many deployment systems include one or more pressure or deformation responsive strips disposed in or on the front and/or rear bumpers. See, for example, the U.S. Pat. No. 6,784,792 to Mattes et al., which suggests the use of wire strain, piezo-electric film, magneto-electric, magneto-resistive or optical sensor elements on the bumper fascia. In another approach disclosed in the U.S. Pat. No. 6,607,212 to Reimer et al., light energy scattered within a block of translucent polymeric foam disposed between the bumper fascia and a rigid bumper frame element is detected to form a measure of crush experienced in a collision.

SUMMARY OF THE INVENTION

The present invention is directed to an improved impact sensing apparatus including a laterally extending air channel within a block of foam or other crushable medium disposed between the bumper fascia and a rigid bumper frame element, and one or more airflow sensors for detecting air displacement within the air channel. The air channel may be defined by a flexible hollow tube embedded within the crushable medium or by a molded-in air cavity in cases where the crushable medium is formed by molding. The measured airflow provides a measure of crush rate, and two or more airflow sensors may be distributed within the air channel to optimize impact detection response time and to identify the impact location. Additionally, the size and placement of the air channel within the compressible medium can be configured to control the sensitivity of the sensing apparatus.

DESCRIPTION OF THE PREFERRED EMBODIMENT

Figure 1:
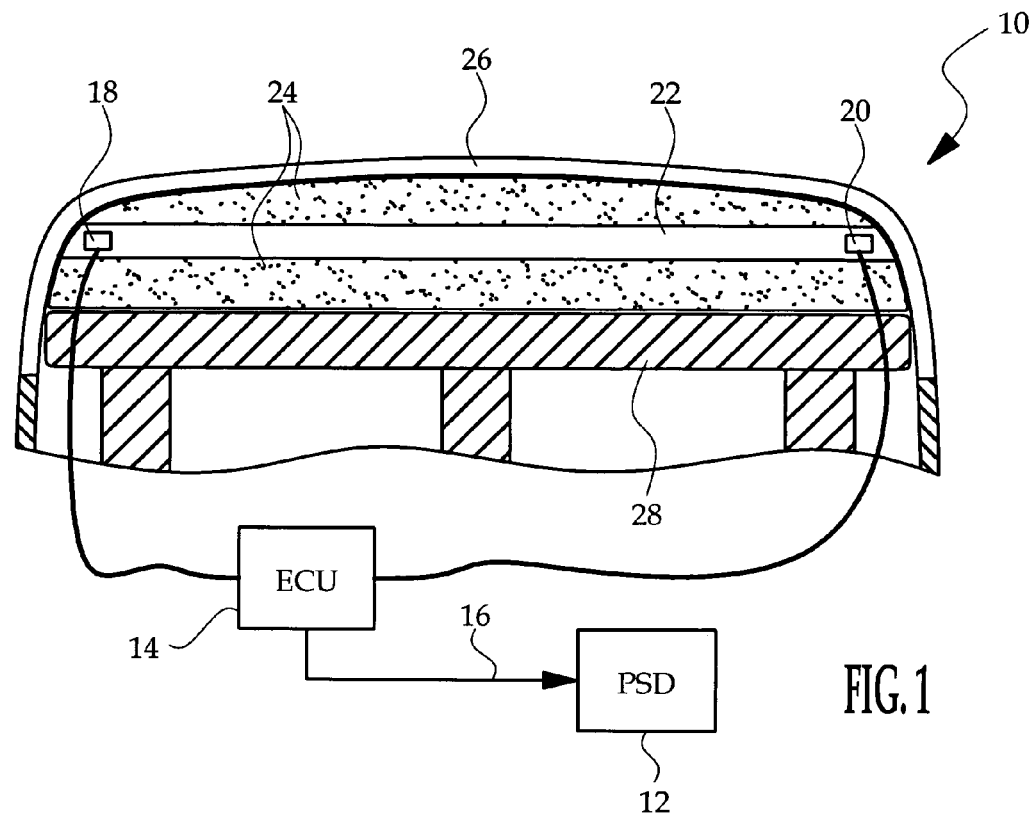
FIG. 1 is a diagram of a vehicle bumper equipped with a pedestrian impact sensing apparatus according to this invention.
Figure 2:
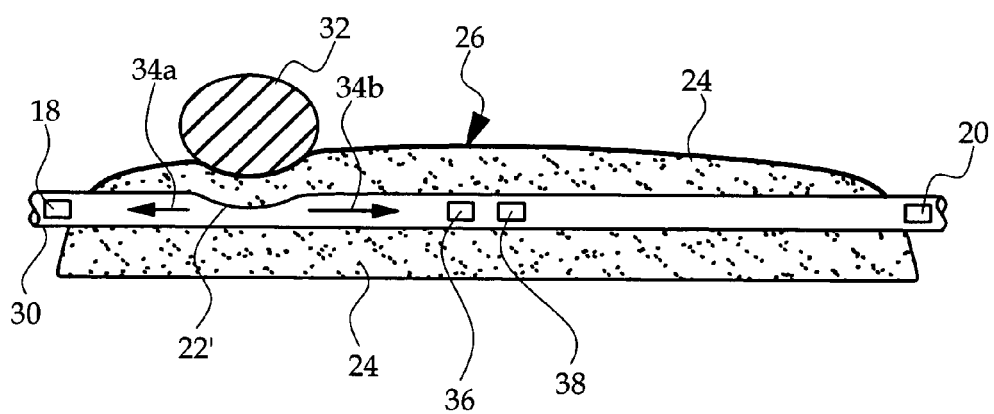
FIG. 2 is a diagram of an alternative configuration of the sensing apparatus of FIG. 1, and further illustrates deformation due to a pedestrian impact.

Referring to FIG. 1, the reference numeral 10 designates a vehicle that is equipped with one or more pedestrian safety devices (PSDs) and a sensing system for deploying the safety devices when a pedestrian impact is detected. The PSDs are designated by a single block 12, and may include one or more pedestrian air bags and a mechanism for changing the inclination angle of the vehicle hood. The PSDs are selectively activated by a microprocessor-based electronic control unit (ECU) 14, which issues a deployment command on line 16 when a pedestrian impact is detected. The ECU 14 detects pedestrian impacts based on airflow signals produced by one or more airflow sensors 18, 20. The airflow sensors 18, 20 are disposed in an air channel 22 that extends laterally across the vehicle; that is, perpendicular to the direction of vehicle travel. The air channel 22 resides within a block 24 of foam or other crushable energy-absorbent material disposed between a bumper fascia 26 at the leading edge of vehicle 10 and a rigid bumper frame element 28 that extends substantially parallel to the bumper fascia 26. The air channel 22 may be defined by an open-ended flexible tube 30 passing through the foam block 24 as depicted in FIG. 2, or simply by an air-filled void or cavity in the foam block 24 as depicted in FIG. 1. In either case, the airflow sensors 18, 20 measure airflow without substantially impeding airflow within the air channel 22.

FIG. 2 depicts the fascia 26 and foam block 24 when the vehicle 10 impacts a soft-bodied object 32 such as a pedestrian leg form. The impact locally crushes the foam block 24 and proportionally crushes the air passage 22 as indicated by the reference numeral 22'. The localized crushing of air passage 22 produces transient airflows away from the crush zone as indicated by the arrows 34a and 34b. The airflows are respectively detected by the sensors 18 and 20, and the airflow signals produced by sensors 18 and 20 provide a measure of the crush rate and impact location to ECU 14.

The embodiment of FIG. 2 depicts an additional pair of airflow sensors 36, 38 disposed approximately at the midpoint of the air passage 22. The addition of sensors 36 and 38 improves the response time of the sensing apparatus by shortening the distance between an impact and a pair of airflow sensors. Furthermore, the difference between the airflow signals produced by sensors 36 and 38 provides an early indication of the airflow direction within air passage 22; since the sensors 36 and 38 are located in the mid-section of the air passage 22, the airflow direction tells ECU 14 which side of the vehicle 10 was impacted by the object 32.

Figures 3A, 3B:
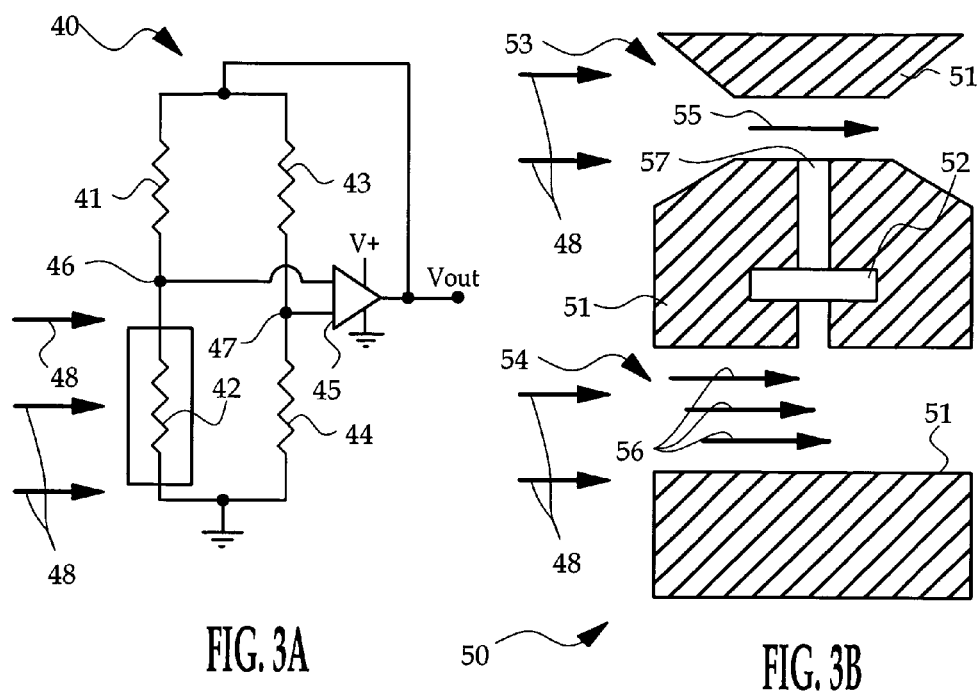
FIG. 3A is a diagram of a heated element airflow sensor for the sensing apparatus of FIGS. 1-2.
FIG. 3B is a diagram of a venturi airflow sensor for the sensing apparatus of FIGS. 1-2.
Figure 3C:
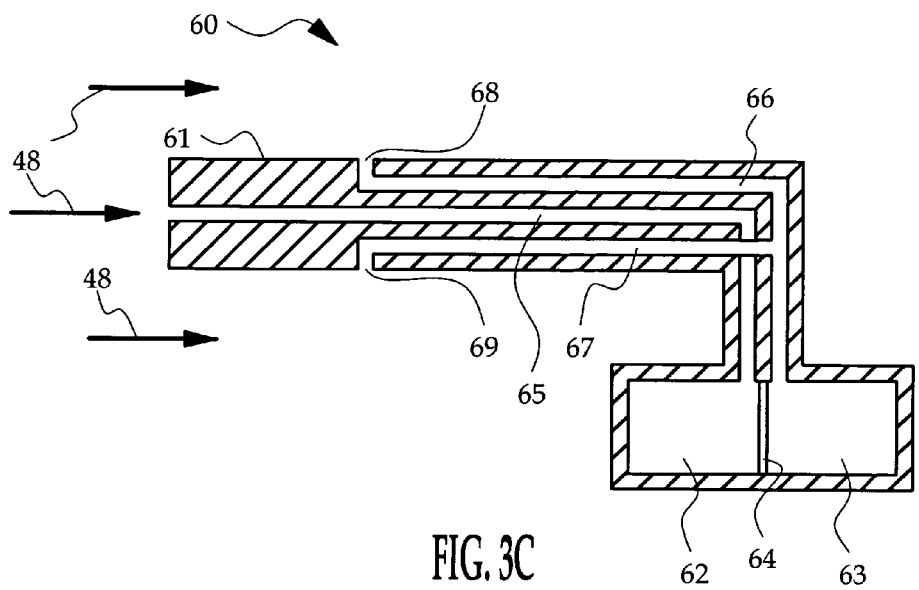
FIG. 3C is a diagram of a Pitot tube airflow sensor for the sensing apparatus of FIGS. 1-2.

FIGS. 3A-3C depict three examples of suitable airflow sensors. FIG. 3A depicts a heated element sensor 40; FIG. 3B depicts a venturi sensor 50; and FIG. 3C depicts a Pitot tube sensor 60.

Referring to FIG. 3A, the heated element sensor 40 comprises four resistors 41, 42, 43, 44 configured in a conventional Wheatstone bridge arrangement and a differential amplifier 45 responsive to the potential difference between the bridge nodes 46 and 47. The amplifier 45 adjusts the bridge voltage (Vout) as required to balance the bridge. The resistors 41-44 are selected so that when the bridge is balanced, the resistor 42 (which may be a wire, for example) is maintained at an elevated temperature such as 250° C. The resistor 42 is positioned within the air channel 22 so that transient airflow (as represented by the arrows 48) due to a pedestrian impact displaces the heated air surrounding the resistor 42 with air at essentially ambient temperature. This cools the resistor 42 and the amplifier 45 responds by increasing the bridge voltage. In this way, the amplifier output voltage Vout provides a measure of the magnitude of the airflow across resistor 42.

Referring to FIG. 3B, the venturi sensor 50 has a sensor body 51 and a differential pressure sensor 52, such as a silicon diaphragm sensor. The sensor body 51 is located within the air channel 22 and is configured to define restricted and unrestricted airflow ports 53, 54 that are in-line with the transient air airflow (designated by arrows 48) produced by deformation of the air channel 22 during a pedestrian impact. The pressure sensor 52 is disposed in a passage 57 extending between the airflow ports 53, 54, and the difference between the airflow in restricted airflow port 53 (designated by arrow 55) and the airflow in unrestricted airflow port 54 (designated by arrows 56) produces a corresponding pressure difference across the sensor 52. The sensor 52 produces a signal corresponding to the pressure difference, which is also an indication of the magnitude of the impact-related transient airflow.

Referring to FIG. 3C, the Pitot tube sensor 60 has a sensor body 61, first and second pressure chambers 62, 63 and a differential pressure sensor 64 separating the pressure chambers 62 and 63. The sensor body 61 is located within the air channel 22 and defines a central air passage 65 having an inlet 66 that is in-line with the transient air airflow (designated by arrows 48) produced by deformation of the air channel 22 during a pedestrian impact, and one or more static air passages 66, 67 having inlets 68, 69 that are perpendicular to the impact-related airflow. The central air passage 65 is coupled to the first pressure chamber 62, while the static air passages 66, 67 are coupled to the second pressure chamber 63. The sensor 64 is responsive to the difference in pressures between the first and second chambers 62, 63, and such difference provides a measure of velocity of the impact-related transient airflow.

Figure 4:
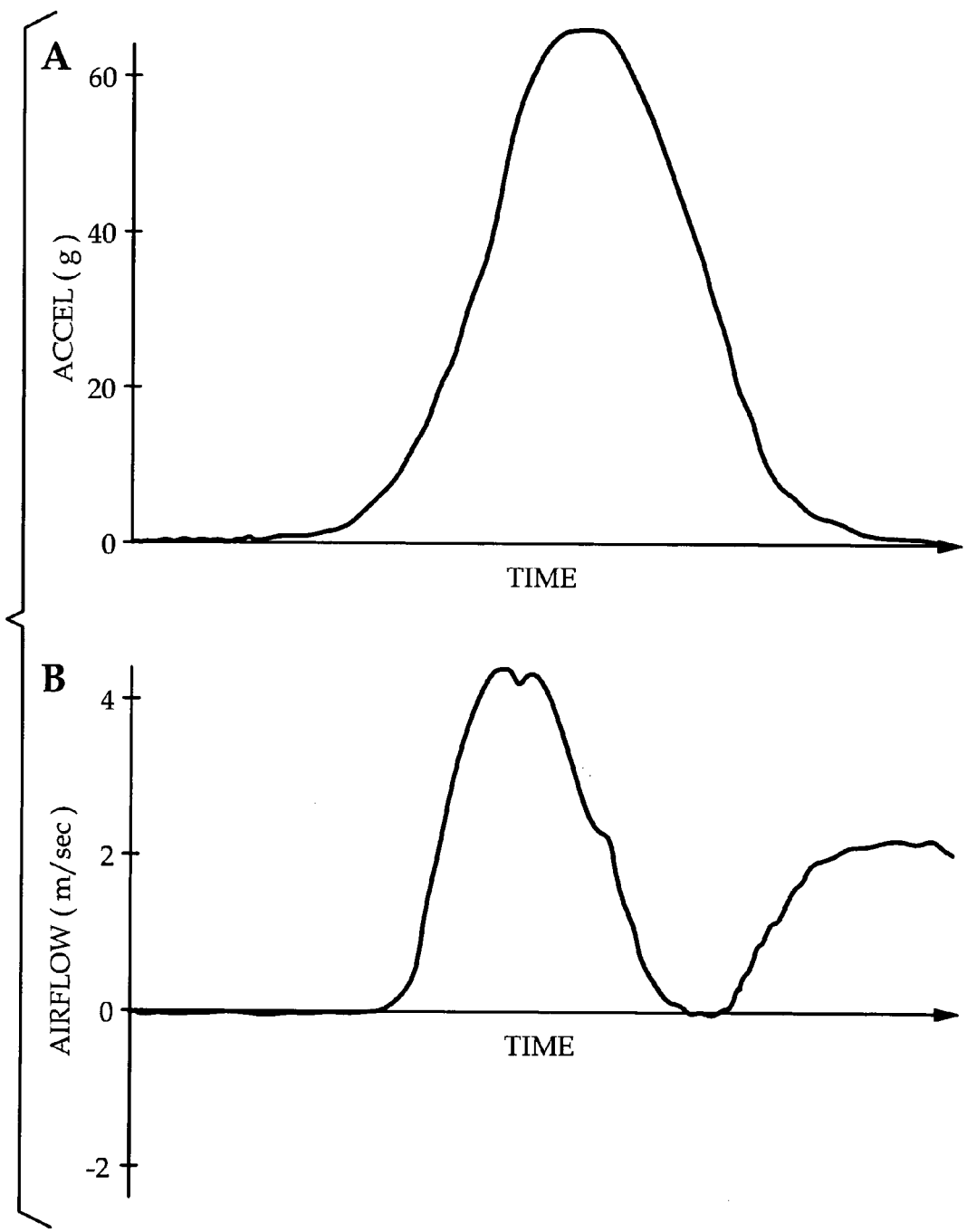
FIG. 4, Graphs A and B, graphically depict test data for the sensing apparatus of the present invention.

FIG. 4, Graphs A-B, depict data collected in a mechanization of the present invention during a 13.7 MPH collision of a human leg form with the center of a stationary vehicle bumper constructed substantially as depicted in FIGS. 1-2. The leg form was instrumented with an accelerometer, and FIG. 4A depicts the measured deceleration during the impact. In the test apparatus, two Pitot tube airflow sensors were installed in the outboard ends of a flexible tube within a foam block substantially as depicted in FIG. 2, and Graph B depicts the air velocity measured by one of the airflow sensors. In general, the magnitude of the airflow signal provides a predictable and reliable measure of impact severity. The decision as to whether deployment of one or more PSDs is warranted for a given impact can be made by calibrating a fixed or time-variant threshold and deploying the restraint(s) if the measured airflow exceeds the threshold. The depicted data additionally demonstrates that the severity of an impact can be determined very quickly, enabling timely deployment of supplemental restraints for virtually any crash event. In particular, the test illustrates the worst-case time response for the sensing apparatus because the airflow sensors are equally displaced from the point of impact. Even so, the data shows that the impact detection time is only about 5 milliseconds for an air channel that is six feet in length. About one-half of the response time is required for the airflow pulse to reach either airflow sensor, with the remaining time required for signal processing in ECU 14.

In summary, the present invention provides a novel sensing apparatus capable of detecting pedestrian impacts both quickly and reliably by responding to a transient airflow in an air channel within a crushable medium. Since the sensors are responsive to transient airflow, the air channel does not need to be closed or sealed. Additionally, the slope of the measured airflow signal can be used to infer crush rate, for purposes of discriminating between pedestrian impacts and other impacts.

While the present invention has been described with respect to the illustrated embodiments, it is recognized that numerous modifications and variations in addition to those mentioned herein will occur to those skilled in the art. For example, the air channel 22 may be equipped with more or fewer airflow sensors than shown, and the apparatus may be applied to a rear bumper or to a vehicle body panel such as a fender or side-door. Also, the size and placement of the air channel 22 within the foam block 24 can be configured to control the sensitivity of the sensing apparatus. Placing the air channel closer to the fascia 26 increases the detection sensitivity, while placing the air channel closer to the bumper frame element 28 reduces the detection sensitivity. Such placement of the air channel 22 can be used, for example, to provide maximum sensitivity in the central area of the bumper and reduced sensitivity near the ends of the bumper. Alternatively or additionally, the shape of the air channel 22 may be configured to provide increased or decreased sensitivity; for example the air channel 22 may be larger in diameter in the center than near the ends to heighten the detection sensitivity for impacts near the center of the bumper. Accordingly, it is intended that the invention not be limited to the disclosed embodiments, but that it have the full scope permitted by the language of the following claims.

The invention claimed is:

1. Apparatus for sensing an impact with a vehicle bumper, comprising:
   a crushable medium disposed between a bumper fascia and a rigid frame element extending substantially parallel to said bumper fascia;
   an air channel in said crushable medium, said air channel having first and second ends that are open;
   a first airflow sensor responsive to airflow in the air channel at said first end;
   a second airflow sensor responsive to airflow in the air channel at said second end; and
   signal processing means for processing first and second signals produced by said first and second airflow sensors to detect an impact with said bumper that produces an airflow pulse within said air channel and comparing said first and second signals to determine a location of said impact on said bumper.

2. The apparatus of claim 1, wherein said signal processing means processes said first and second signals to determine a crush rate of said crushable medium due to said impact.

3. The apparatus of claim 1, where said crushable medium is molded foam, and said air channel is a molded-in void formed in said crushable medium.

4. The apparatus of claim 1, where said air channel is defined by a flexible hollow tube extending through said crushable medium.

5. The apparatus of claim 1, comprising:
   a third airflow sensor responsive to airflow in the air channel substantially at a midpoint of said air channel.

6. The apparatus of claim 5, where said signal processing means processes said first and second signals and a third signal produced by said third airflow sensor to detect said impact and to determine said location of said impact.

7. The apparatus of claim 1, comprising:
   third and fourth airflow sensors responsive to airflow at third and fourth locations in a mid-section of said air channel, where said signal processing means processes said first and second signals, and third and fourth signals produced by said third and fourth airflow sensors to detect said impact and to determine said location of said impact.

8. The apparatus of claim 1, where said air channel is positioned within said crushable medium to vary a sensitivity of said apparatus to said impact.

9. The apparatus of claim 1, where at least one of said airflow sensors includes a heated element disposed in said air channel.

10. The apparatus of claim 1, where at least one of said airflow sensors includes restricted and unrestricted passages aligned with an airflow in said air channel, and a differential pressure sensor responsive to a pressure difference between said restricted and unrestricted passages.

11. The apparatus of claim 1, wherein at least one of said airflow sensors is a Pitot tube sensor disposed in said air channel.

* * * * *